(12) United States Patent
Shi et al.

(10) Patent No.: US 9,339,973 B2
(45) Date of Patent: May 17, 2016

(54) CONTROL METHOD FOR STEREOLITHOGRAPHY STRUCTURE USED IN 3-D PRINTING

(75) Inventors: Kwo-Yuan Shi, Hsinchu (TW); Ching-Sung Lin, Hsinchu (TW); Hung-Chuan Lo, Hsinchu (TW); Jui-Yi Wu, Hsinchu (TW); Wei-Yu Chen Chen, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 1020 days.

(21) Appl. No.: 13/438,276

(22) Filed: Apr. 3, 2012

(65) Prior Publication Data

US 2012/0257175 A1  Oct. 11, 2012

(30) Foreign Application Priority Data

Apr. 11, 2011  (CN) .......................... 2011 1 0106266

(51) Int. Cl.
*G05B 19/4099* (2006.01)
*B29C 67/00* (2006.01)

(52) U.S. Cl.
CPC ........ *B29C 67/0088* (2013.01); *G05B 19/4099* (2013.01)

(58) Field of Classification Search
None
See application file for complete search history.

(56) References Cited

U.S. PATENT DOCUMENTS

| | | | | |
|---|---|---|---|---|
| 5,345,391 A | * | 9/1994 | Hull et al. | 700/182 |
| 5,561,534 A | * | 10/1996 | Ishida et al. | 358/448 |
| 5,953,448 A | * | 9/1999 | Liang | 382/154 |
| 6,526,160 B1 | * | 2/2003 | Ito | 382/117 |
| 6,717,697 B1 | * | 4/2004 | Oosawa | 358/1.9 |
| 2001/0008230 A1 | * | 7/2001 | Keicher et al. | 219/121.63 |
| 2002/0059049 A1 | * | 5/2002 | Bradbury et al. | 703/11 |
| 2003/0053082 A1 | * | 3/2003 | Tomito et al. | 358/1.2 |
| 2004/0263550 A1 | * | 12/2004 | Mitsuzawa | 347/12 |
| 2005/0010323 A1 | * | 1/2005 | Cocciadiferro et al. | 700/174 |
| 2005/0210195 A1 | * | 9/2005 | Teicher et al. | 711/115 |
| 2007/0056598 A1 | * | 3/2007 | Bray et al. | 131/284 |
| 2007/0127069 A1 | * | 6/2007 | Steele et al. | 358/1.16 |
| 2007/0203599 A1 | * | 8/2007 | Shibata et al. | 700/98 |
| 2009/0185205 A1 | * | 7/2009 | Nakajima | 358/1.9 |
| 2011/0032325 A1 | * | 2/2011 | Harris | 348/36 |
| 2014/0101587 A1 | * | 4/2014 | Sekine | 715/769 |
| 2014/0132608 A1 | * | 5/2014 | Mund et al. | 345/440 |

* cited by examiner

*Primary Examiner* — Robert Fennema
*Assistant Examiner* — Jay Jung
(74) *Attorney, Agent, or Firm* — Kirton McConkie; Evan R. Witt

(57) ABSTRACT

Disclosed is a control method for stereolithography structure, including the steps of: providing a stereolithography structure including a main circuit system, an interface system, and a USB transmission interface. The main circuit system controls the interface system and the interface system includes a printing driving platform for allowing an user to operate the stereolithography structure; providing a computer system including a data transmission platform for generating printing data by performing a slicing operation according to operational instructions and converting slicing process data of a 3-D object into 2-D slicing printing format image data; and transmitting and receiving the 2-D slicing printing format image data through the USB transmission interface, and deciphering data and re-formatting data, in order to finish pre-planning procedure of driving operation, thereby transmitting data to the printing driving platform to drive the printing driving platform to finish object forming operation by ink spraying operations.

20 Claims, 16 Drawing Sheets

CONTROL METHOD FOR STEREOLITHOGRAPHY STRUCTURE USED IN 3-D PRINTING

FIELD OF THE INVENTION

The invention is related to a control method, and more particularly to a control method for the stereolithography structure.

BACKGROUND OF THE INVENTION

The rapid prototyping technique is developed based on the concept of additive manufacturing technology. The major feature of this technique is the readiness of solid forming, and the ability of automatically and rapidly converting a design scheme with a complicated shape into 3-D models without the need of cutlery, molds, and jigs. Thus, this technique can greatly shorten the research and design cycle of the new product and reduce the developing cost. Moreover, the marketing timing of the new product and the one-time success rate can be guaranteed. This technique can provide a complete and convenient product design and communication tool for technicians and non-technicians such as the entrepreneurs and end users. Furthermore, this technique can significantly promote the competitiveness of the product and expedite the fast response to the market.

However, the control method for the stereolithography structure used by conventional rapid prototyping technique requires an input unit such as a keyboard, a mouse, or a button, and a display unit such as a liquid crystal display (LCD), a cathode ray tube monitor (CRT monitor). The display unit and the input unit are independent from each other and are separately mounted on the constructive base of the stereolithography structure. The input unit is used to allow the user to manipulate the structure and input information and messages, and control the operations of the stereolithography structure. The display unit is used to display the user interface consisted of texts. The user interface may include the function entries covering various messages and information of the stereolithography structure. However, as the display unit and the input unit are independently and separately mounted instead of jointly mounted in the same area, the user have to look at the user interface shown on the display unit first and then operate the input unit with reference to the display unit, such that the functions and messages of the display unit are executed or displayed, thereby completing the manipulation and the operation of the stereolithography structure.

More importantly, the conventional slicing method of the stereolithography structure employs topology to generate the sliced contour. As the input sequence of the grids is not standardized, the arrangement of the grids is not sequential. This would cause the tangents and tangential lines of the grid to be non-sequential. Hence, a large quantity of slice operations is required during the search process of the contour connection and grid connection. This would deteriorate the slice rate. When a discontinuous surface is existed, surfaces would be unlikely to be linked up with each other. Thus, the conventional slicing method can not be applied to objects with discontinuous surfaces. Also, the printing resolution of the conventional stereolithography structure is about 300× 450 dot per inch (DPI). In this manner, the conventional stereolithography structure has the problem of insufficient resolution. More disadvantageously, the 3-D models formed thereby will be deviant from the expectation due to the incomplete topological slices. Even worse, the 3-D models can not be formed due to the incomplete topological slices.

Moreover, the stereolithography structure used in the conventional rapid prototyping technique usually requires two or more control computers to handle the internal driving operation, the internal computation, and the external operation. However, the communications and operation modes between the computers are conducted by transmitting the instructions and messages received by the external computers to the internal computers that are used to handle the internal driving operation and the internal computation. When the internal computers are executing computation and control operations, the external computers enters the idle state. When the computation is completed, the internal computers that are used to handle the internal driving operation and the internal computation transmit the data to the external computers, such that the external computers can output data and display information. Under this condition, the internal computers that are used to handle the internal driving operation and the internal computation will enter the idle state. Such interlaced operation mode will cause the intermittent idling of the computers, which will be time-wasting and cost-inefficient as the electricity is squandered. Also, such operation mode will make the user operation more complicated and increase the manpower cost.

Besides, the data transmission interface used between the conventional control computers is the conventional RS-232 serial port with a maximum transmission rate of 20 kbps. As is well known in the art, conventional RS-232 serial port is not allowed to be hot swapped or hot plugged, which is prone to damage the internal components of the stereolithography structure. More disadvantageously, the anti-noise effect of the conventional RS-232 serial port is quite bad, which will cause the interlaced idling time and waiting time between the computers to be prolonged. If the slicing model of the stereolithography structure is quite complicated, the external computers will be idled for a long time, even worse the external computers will be idled for more than one day. Also, the conventional 3-D rapid prototyping apparatus only support one kind of transmission interface, such as RS-232, Ethernet, and USB. A single transmission interface can not satisfy all kinds of office users. For example, the selection of transmission interface by an individual user and the selection of transmission interface by an office user are different. If the transmission interface of the rapid prototyping apparatus can not meet the user's printing environment, the versatility of the rapid prototyping apparatus will be discounted. Also, the conventional 3-D rapid prototyping apparatus can be used to accomplish the printing task by default embedded control computer or add-on control computer. If such default control computers are scarce, the user can not proceed with the printing job. Such embedded or add-on control computers will increase the volume of the rapid prototyping apparatus and increase the cost of the control computers. Also, the troubleshooting of the rapid prototyping apparatus and the version update of the program have to be accomplished by the control computers, which means that the user can not operate the rapid prototyping apparatus without the control computers. Hence, the stability of the control computers will impose additional risks. The aforementioned problems will cause lots of tangible and intangible resource waste, and affect the ecological environment of the Earth. The invention can address these problems.

SUMMARY OF THE INVENTION

An object of the invention is to provide a control method for the stereolithography structure for addressing the problems encountered by the prior art that the versatility of the control interface is poor, the computer system is complicated and the idling time of the computer system is too long, the printing channel is limited, and the transmission rate of the transmission interface is low, the risk of damaging the apparatus is too high, the printing resolution is too low, the efficiency of the slicing method is too low, and the conventional slicing method can not be applied to objects with discontinuous surfaces.

Another object of the invention is to provide a control method for the stereolithography structure that is featured by easy operation by an intuitional graphical user interface, a single and simplified computer system, versatile and portable printing channel, enhanced transmission rate with a high-speed transmission interface, lower risk of damage by a hot-swappable or hot-pluggable protection mechanism, improved printing resolution, and enhanced slicing efficiency and the ability to process objects with discontinuous surfaces by smart discontinuous slicing method.

To attain the foregoing objects, the invention proposes a control method for a stereolithography structure, including the steps of: providing a stereolithography structure including a main circuit system, an interface system, and a universal serial bus transmission interface, wherein the main circuit system is used to control the interface system and the interface system includes a printing driving platform for allowing an user to operate the stereolithography structure; providing a computer system including a data transmission platform for generating printing data by performing a slicing operation according to operational instructions and converting slicing process data of a 3-D object which is operated externally into 2-D slicing printing format image data; and transmitting and receiving the 2-D slicing printing format image data converted by the data transmission platform of the computer system through the universal serial bus transmission interface, and deciphering received data and re-formatting the received data; or by a diversified transmission interface, allowing an individual user to transmit data of a control computer for printing through the universal serial bus transmission interface and allowing an office user to perform network scheduled printing through an Ethernet interface or a WIFI interface; or by a cloud computing architecture, getting a processing service from a remote host through Internet and providing a printing file, in order to finish pre-planning procedure of driving operation, thereby transmitting data to the printing driving platform to drive the printing driving platform to finish object forming operation by ink spraying operations.

Now the foregoing and other features and advantages of the invention will be best understood through the following descriptions with reference to the accompanying drawings, in which:

DESCRIPTION OF THE PREFERRED EMBODIMENT

An exemplary embodiment embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1A:
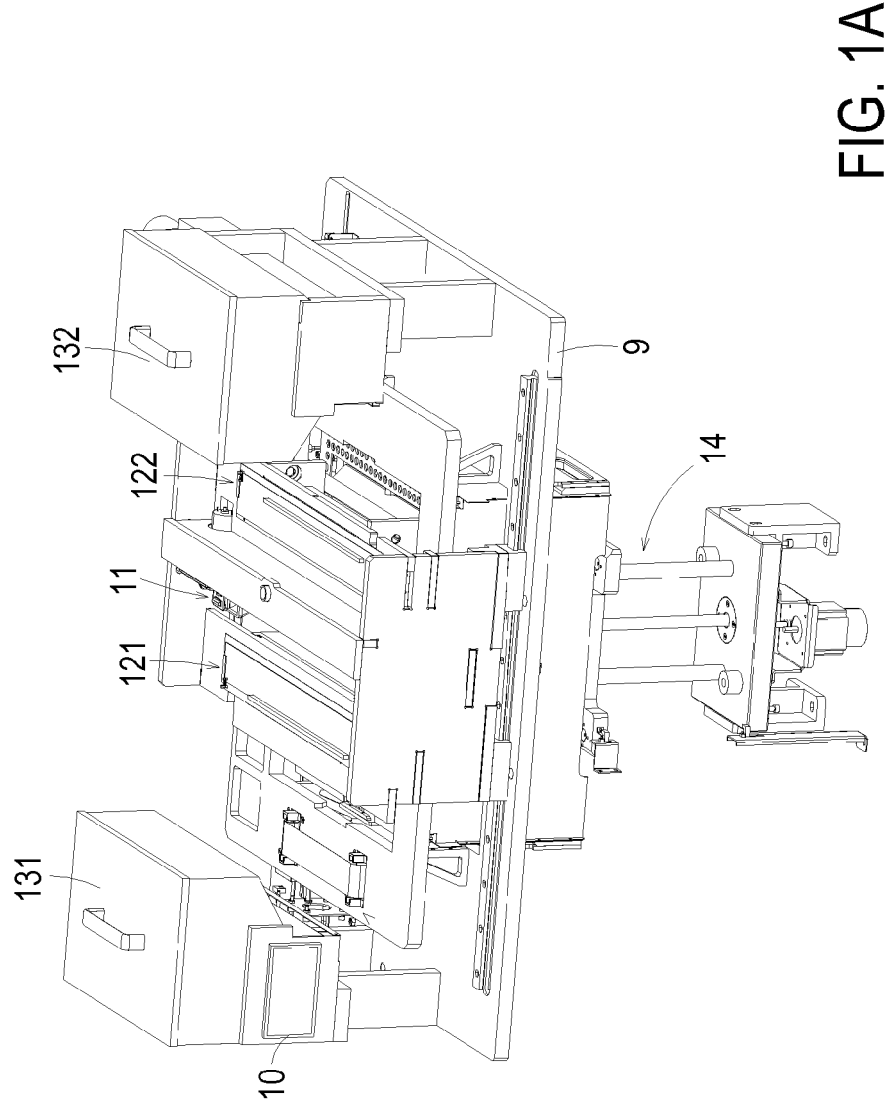
FIG. 1A shows the 3-D view of the stereolithography structure according to an exemplary embodiment of the invention.

Referring to FIG. 1A, the 3-D view of the stereolithography structure according to an exemplary embodiment of the invention is shown. In FIG. 1A, the stereolithography structure 1 includes a constructive base 9. The stereolithography structure 1 includes a touchscreen panel, a printing module 11, a plurality of toner storage tanks, a plurality of toner supply tanks, an elevator 14, and a constructive tank (not shown) mounted on the constructive base 9. The constructive tank includes a constructive platform and is positioned by the connection with the elevator 14. The constructive platform is used to be elevated/descended within the constructive tank by the driving of the elevator 14. Therefore, the constructive platform can provide constructive powder that is stacked in layers for adhesively jet printing by the printing module 11. The toner supply tanks may include two toner supply tanks 131 and 132 that are respectively mounted on the left side and the right side of the stereolithography structure for providing the constructive powder required to produce 3-D objects and are driven by the printing module 11 to move to the right or left. The toner storage tanks may include two toner storage tanks 121 and 122 that are respectively mounted on the left side and the right side of the printing module 11 and are driven by the printing module 11. The toner supply tank 131 and the toner storage tank 121 are located on the same side, and the toner supply tank 131 is used to supply constructive powder to the toner storage tank 121 for use in the subsequent powder laying operation. The toner supply tank 132 and the toner storage tank 122 are located on the same side, and the toner supply tank 132 is used to supply constructive powder to the toner storage tank 122 for use in the subsequent powder laying operation. The printing module 11 is mounted on the constructive base for being driven thereby to displace, thereby performing jet printing operation by laying powder on the constructive platform within the constructive base to form a 3-D object.

Also, the inventive stereolithography structure further employs an intuitional and graphical human-machine interface. A touchscreen panel 10 is provided to locate the control inputs and the apparatus state in the same area, so that the user can observe the graphical manifestation through the touchscreen panel 10 by the intuitive gesture operation. Compared to the conventional stereolithography structure which employs buttons and small-sized LCD, the control unit consisted of the keyboard-based user interface or the knob-based user interface can not attain the intuitive operation. Also, the conventional stereolithography structure can not allow the input unit and the display unit to be located in the same area. Thus, the conventional stereolithography structure needs to pre-assign two areas for the design of the input unit and the display unit, which causes additional burden on space consumption and aesthetic design. The inventive intuitional graphical user interface employs the switchable split pages along with the gesture operation effect to locate the display unit and the input unit in the same area, thereby attaining an intuitive operation environment. The intuitive and graphical human-machine interface can achieve an intuitive operation and promote the readability of the apparatus state. The user can understand and learn the operation skills of the apparatus more clearly, and such robust interface can provide better operation efficiency. Also, such interface can bring additional benefits to the aesthetic design of the structure.

Figure 1B:
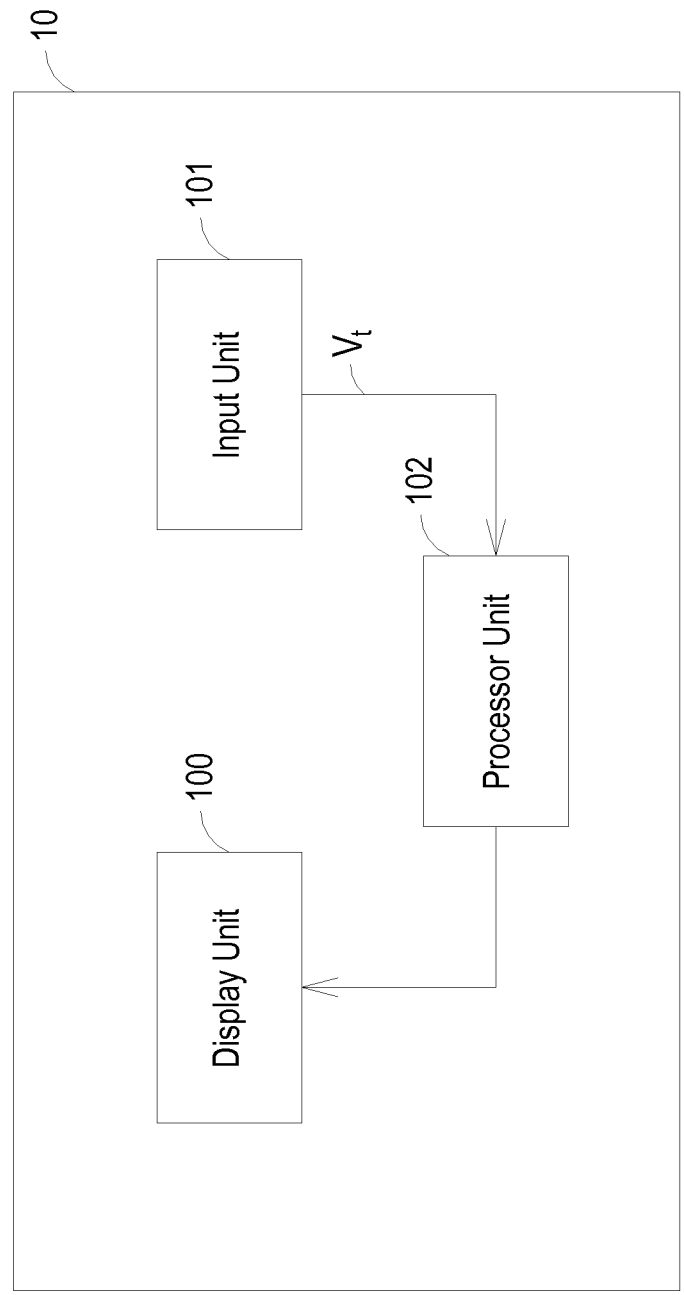
FIG. 1B is the circuit block diagram of the touchscreen panel shown in FIG. 1A.
Figure 1C:
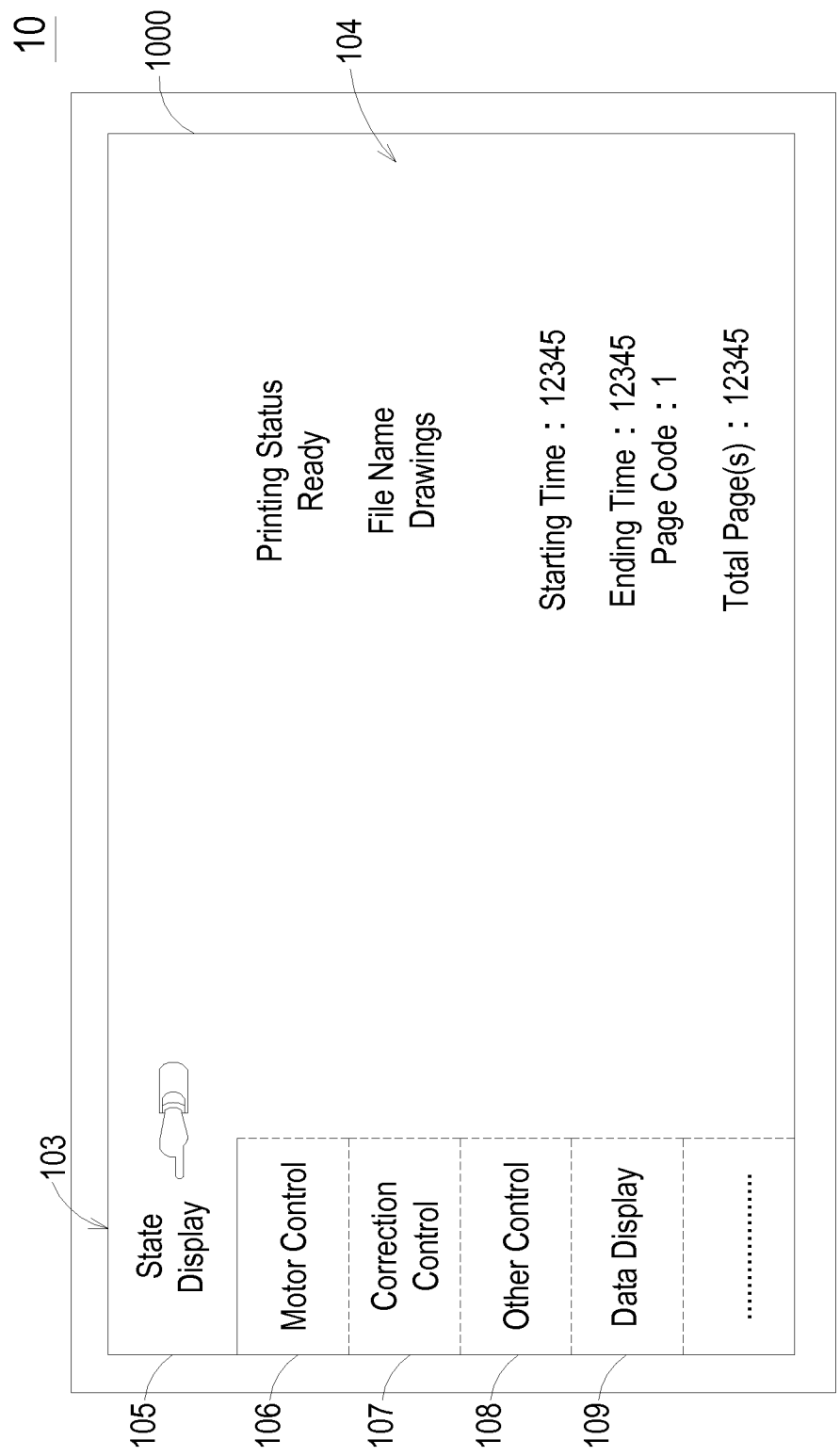
FIG. 1C and FIG. 1D respectively show the snapshots taken when different functions of the user interface shown on the touchscreen panel of FIG. 1A being executed.
Figure 1D:
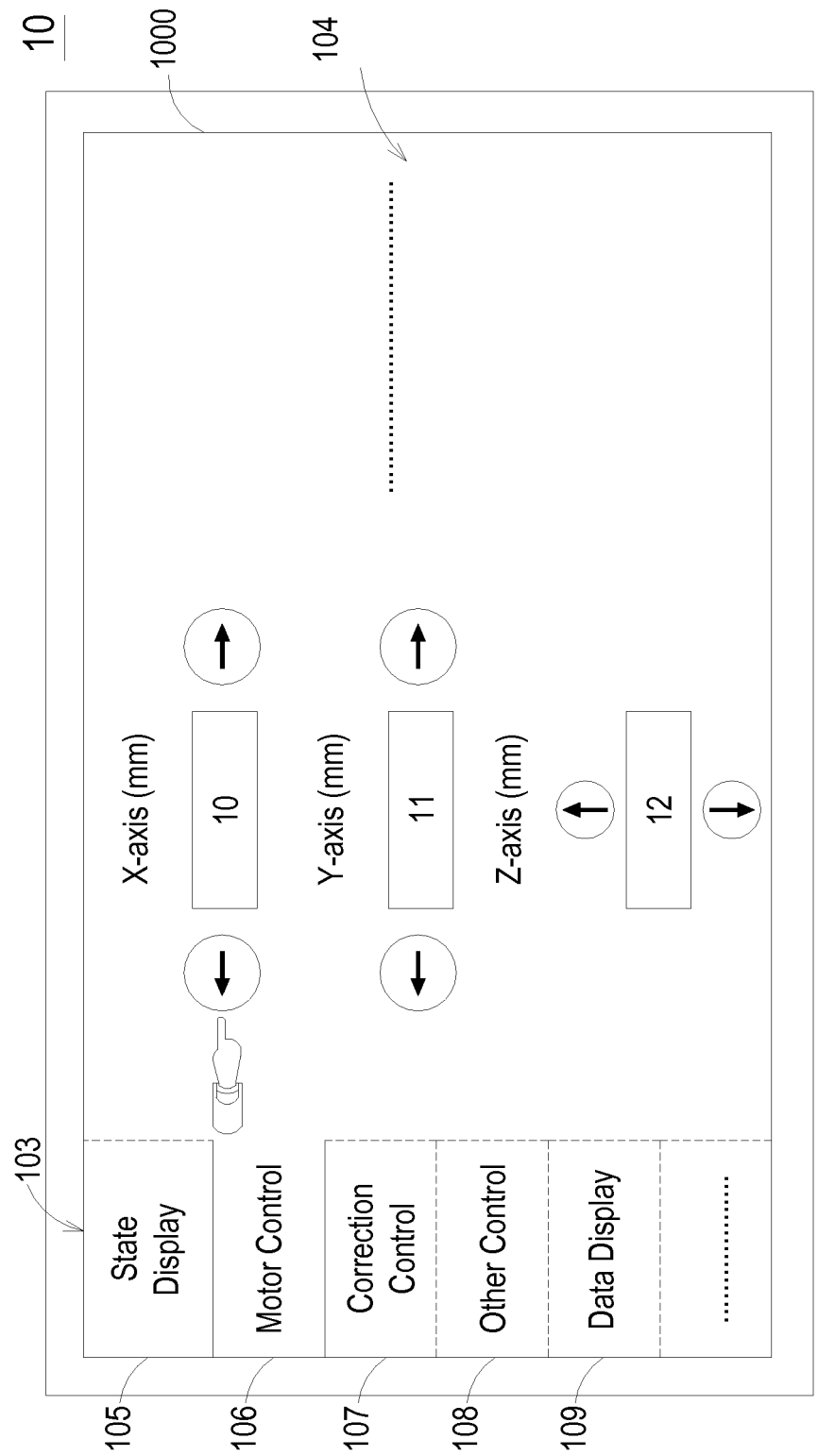

Referring to FIG. 1B and FIG. 1A, wherein FIG. 1B is the circuit block diagram of the touchscreen panel shown in FIG. 1A. As shown in FIG. 1B and FIG. 1A, the touchscreen panel 10 may be substantially located in the upper area of the constructive base 9. The touchscreen panel 10 may be a resistive touchscreen panel, an infrared touchscreen panel, or a capacitive touchscreen panel. The touchscreen panel 10 is used to display a user interface, as shown in FIG. 1C and FIG. 1D. The user interface includes the function entries, related messages and information of the stereolithography structure 1. In addition, the user can touch the function entries of the user interface displayed by the touchscreen panel 10 to drive the stereolithography structure 1 to perform the function selected by the user.

In this embodiment, the touchscreen panel 10 may be a resistive touchscreen panel, an infrared touchscreen panel, or a capacitive touchscreen panel. The touchscreen panel 10 mainly includes a display unit 100, an input unit 101, and a processor unit 102. The display unit 100 may be implemented by a liquid crystal display (LCD) or a cathode ray tube monitor (CRT monitor) for displaying the user interface. The user interface is used to selectively display the function entries, related messages and information of the stereolithography structure 1. Also, the display unit 100 shown on the touchscreen panel 10 further includes a touch area 1000. The area of the touch area 1000 is substantially consistent with the displayable area of the touchscreen panel 10, i.e. the user interface. When the user desires to select the function entry of the user interface shown on the touchscreen panel 10, the user may touch the specific touch point on the touch area 1000 that is corresponding to the desired function entry, thereby controlling the stereolithography structure 1 to perform the related function.

The input unit 101 is substantially placed corresponding to the touch area 1000 of the display unit 100. When the user touches any touch point in the touch area 1000 to select a related function, the input unit 101 will output a gesture signal Vt in response to the position of the touch point in the touch area 1000.

The processor unit 102 is connected to the input unit 101 for receiving the gesture signal Vt from the input unit 101. The gesture signal Vt is used to control the functional operation of the stereolithography structure 1. In this embodiment, the processor unit 102 is also connected to the display unit 100. When the processor unit 102 receives the gesture signal Vt, the processor 102 will control the display unit 100 to display related screen in response to the gesture signal Vt.

As the stereolithography structure 1 integrates the display unit 100 and the input unit 101 into a touchscreen panel 10, the display unit 100 and the input unit 101 are substantially located in the same area. In this manner, when the user is operating the stereolithography structure 1, the user can touch the function entries of the interface shown on the display unit 100 intuitively, thereby controlling the stereolithography structure 1 to perform related function. Therefore, the stereolithography structure 1 can be operated with a convenient and friendly operation mode. Also, the spatial utilization of the constructive base 9 can be boosted as the touchscreen panel 10 is mounted as a single part.

Next, the user interface shown on the touchscreen panel 10 according to the invention will be illustrated. Referring to FIG. 1C and FIG. 1D, wherein FIG. 1C and FIG. 1D respectively show the snapshots taken when different functions of the user interface shown on the touchscreen panel of FIG. 1A being executed. As shown, the user interface shown on the display unit 100 may substantially includes a function menu area 103 and a display operation area 104. The function menu area 103 shows all the function entries of the stereolithography structure 1, e.g. operation state display function 105 for showing the current operation state of the stereolithography structure 1, motor control function 106 for controlling the internal motor operation of the stereolithography structure 1, correction control function 107 for allowing the stereolithography structure 1 to carry out related correction function, other control function 108, and data display function 109 for showing the related information of the stereolithography structure 1. When the user selects the desired function to be carried out by the stereolithography structure 1 through the function entries shown in the function menu area 103, the function entries shown in the function menu area 103 may be tabbed in a manner similar to the switching between the webpages. Also, the display operation area 104 will display the operation buttons and/or related information of the function entry in response to the function entry selected by the user's gesture operation.

For example, when the user touches the state display function 105 in the function menu area 103, as shown in FIG. 1C, the input unit 101 will output the gesture signal Vt indicating that the state display function 105 has been touched in response to the position of the touch point in the touch area 1000. Hence, the processor unit 102 can control the display unit 100 to display related screen in response to the gesture signal Vt. That is, the display operation area 104 can show the current operation state of the stereolithography structure 1 accordingly. When the user touches the motor control function 106 in the function menu area 103, as shown in FIG. 1D, the input unit 101 will output the gesture signal Vt indicating that the motor control function 106 has been touched in response to the position of the touch point in the touch area 1000. That is, the display operation area 104 can show a plurality of arrow buttons and/or related information for the user to control the motor to move in X-axis direction, Y-axis direction, and Z-axis direction.

Figure 2:
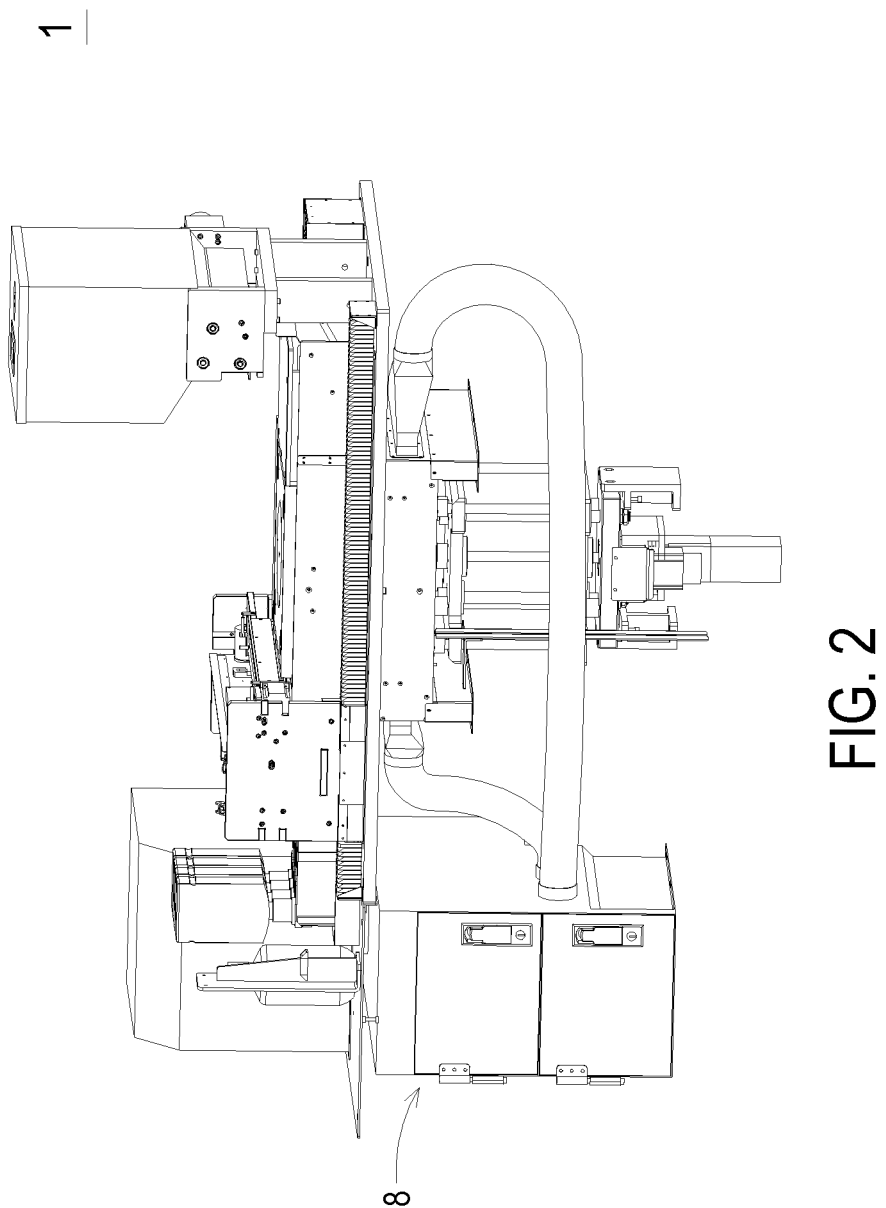
FIG. 2 is the exploded view of the dust filter device in the stereolithography structure according to an exemplary embodiment of the invention.

In addition, during the powder laying process, the toner powder dust having a small mass or a small particle might be blowing in the internal operation space. Moreover, the constructive powder falls down from the through hole of the dropping powder dustproof part, the falling powder dust might collide part of the stereolithography structure 1 and cause rebounded powder dust. Also, the constructive powder that falls in the powder collection tank might bounce back to induce a blowing powder dust whiff. This would pollute the internal operation space. Thus, the invention employs a dust filter device to promote the recycling efficiency of the powder dust for allowing the stereolithography structure 1 to operate normally in the pollution-free environment. Referring to FIG. 2, the dust filter device 8 of the invention is used to absorb and filter the powder dust blowing during the operation of the stereolithography structure 1.

The inventive stereolithography structure 1 also employs a portable printing channel. The portable printing is based on using the popular portable media such as USB memory stick to get data. When the stereolithography structure 1 is placed in an inappropriate computer system, the portable storage device may serve as a data input source for the device. The sliced printing data may be transmitted through the USB transmission interface to the device end for printing. When the conventional stereolithography structure 1 is used, the only printing channel of the conventional stereolithography structure 1 is to use a transmission interface to transmit the sliced data of the external computer to the device end for printing. If the printing environment lacks external computers, the device does not have the printing function.

The portable printing offers an additional printing channel for the stereolithography structure. In addition to the plug-and-play printing mode, when it is desired to print the same solid objects, the sliced data of the solid objects can be repetitively used in order to save the processing time of the slicing procedure. Also, the instability resulted from the external computers can be excluded, thereby allowing direct printing to be carried out.

Thus, the invention allows the stereolithography structure 1 to use the universal serial bus (USB). The inventive stereolithography structure 1 uses the high-speed USB as the transmission interface to allow the printing data to be transmitted readily to the device end for printing. Compared to the conventional stereolithography structure 1 that uses the RS-232 interface as the transmission interface, the maximum transmission rate of the RS-232 interface is about 20 Kbps. However, the data of the stereolithography structure 1 are the sliced data of the formed objects. According to the size and the breadth of the sliced layer, the entire data amount may reach over one thousand pages of image data. Such large quantity of image data must be transmitted to the device end for printing through the transmission interface. If a transmission interface with a low transmission rate is adopted, the objecting forming rate will be dragged down.

The invention employs the USB as the transmission interface for accomplishing the data transmission efficiently. With the promotion of the technical specification and version, the object forming rate of the stereolithography structure 1 will be enhanced. Thus, the inventive stereolithography structure 1 can use a hot-swappable, hot-pluggable protection mechanism to suppress the risk of damage inflicted on the internal components and provide a safeguard mechanism for the internal electronic components. When the conventional stereolithography structure that does not provide a hot-swappable, hot-pluggable protection mechanism is used, the user must be alarmed in operating the stereolithography structure and avoid inadvertent plugging/unplugging actions, in order to prevent the internal components from being affected by abnormal currents and being damaged. If the user does not have excellent operating habits, the stereolithography structure is prone to be damaged in the long run and add operational burdens to the user. The hot-swappable, hot-pluggable protection mechanism can allow the devices to be plugged into or removed from the stereolithography structure without the need of powering down the stereolithography structure when the stereolithography structure is operating. Hence, the hot-swappable, hot-pluggable protection mechanism can provide the function of hot plug and play without burning down the device or the computer system.

Besides, the inventive stereolithography structure 1 employs a diversified transmission interface. The user can select the most appropriate transmission interface as the transmission printing channel depending on the environment and user's demands. Compared to the conventional stereolithography structure that employs a single transmission interface, the user has to conform to the requirements of the device without the options of selecting an appropriate interface. This would cause the environmental layout to be unsatisfied with the user. If a diversified transmission interface is applied, the individual user can select the USB interface to transmit the data of the computer directly for printing, and the office user can select Ethernet interface or the WIFI interface to proceed with network scheduled printing. Therefore, the reliability of the stereolithography structure is improved.

Also, the inventive stereolithography structure 1 employs cloud computing architecture. Under the cloud computing architecture, the cost of the computer equipment is reduced efficiently, the space consumption of the object forming device is reduced, the real-time troubleshooting channel is provided, and the firmware update function is provided. When the stereolithography structure that uses default control computer is used, the user can not operate the printing device without a control computer, which increases the dependency of the printing device on the control computer. Using the inventive stereolithography structure, the user only needs to establish Internet connectivity without depending on high-level, high-performance control computers. Thus, the user can get the processing service from the remote host through the Internet for handling complicated printing files, thereby driving the stereolithography structure to proceed with printing tasks.

Figure 3A:
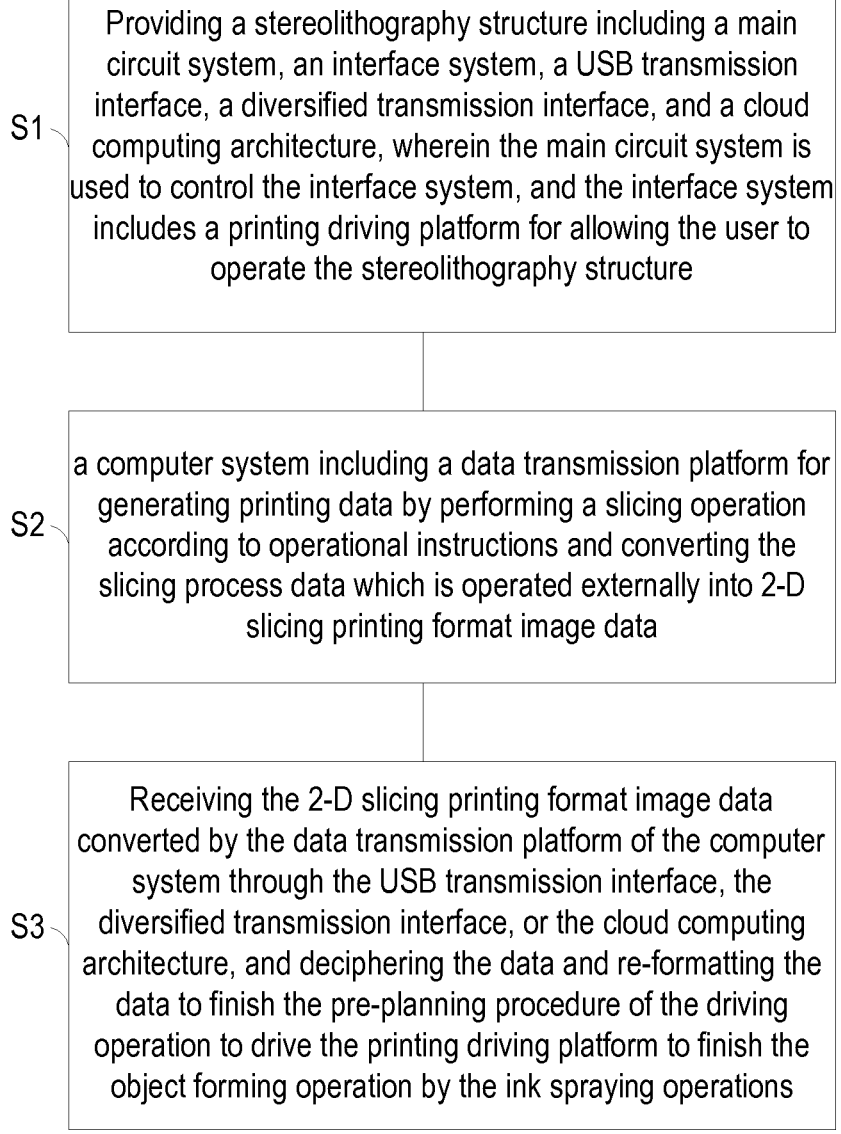
FIG. 3A is the flow chart illustrating the control method applied to the stereolithography structure according to the invention.
Figure 3B:
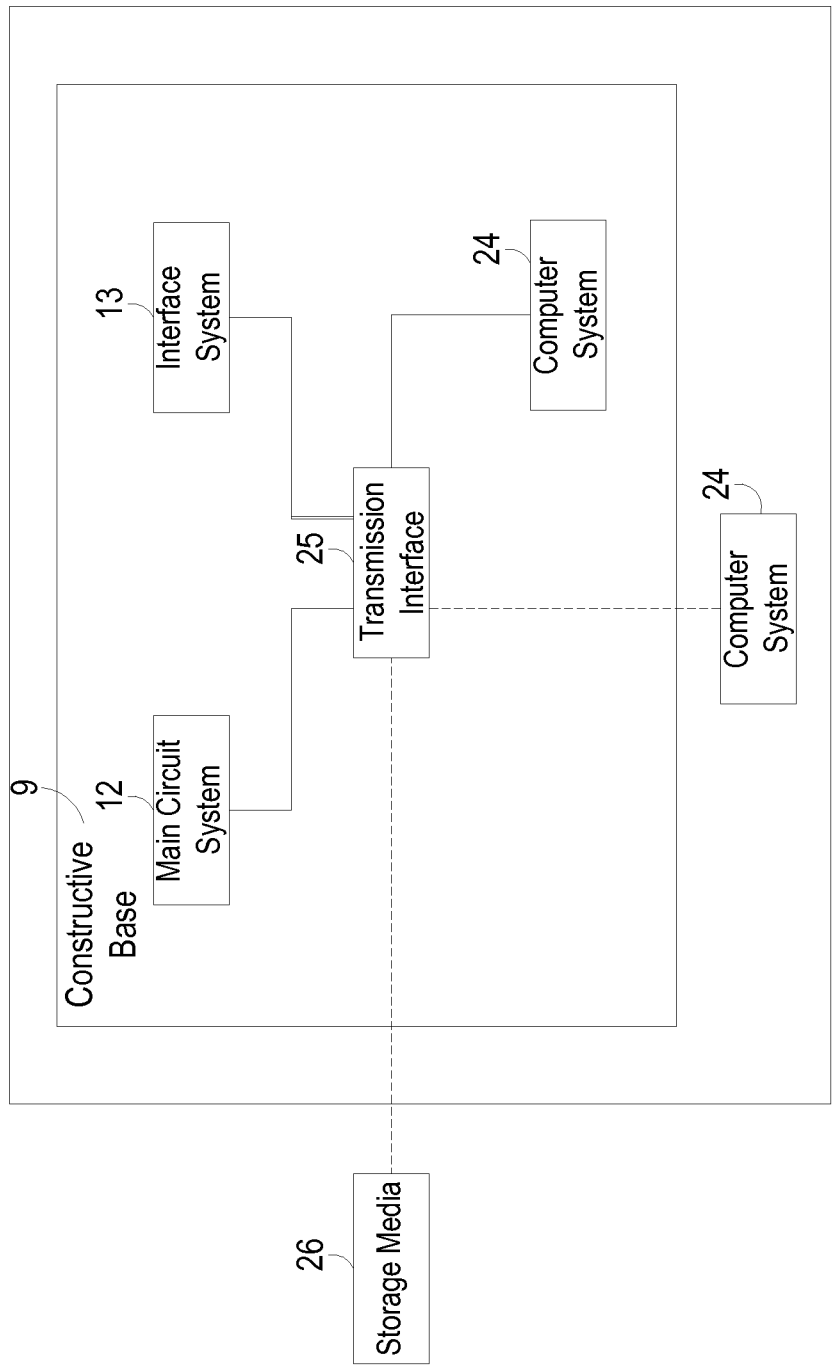
FIG. 3B shows the control system architecture applied to the stereolithography structure according to the invention.
Figure 3C:
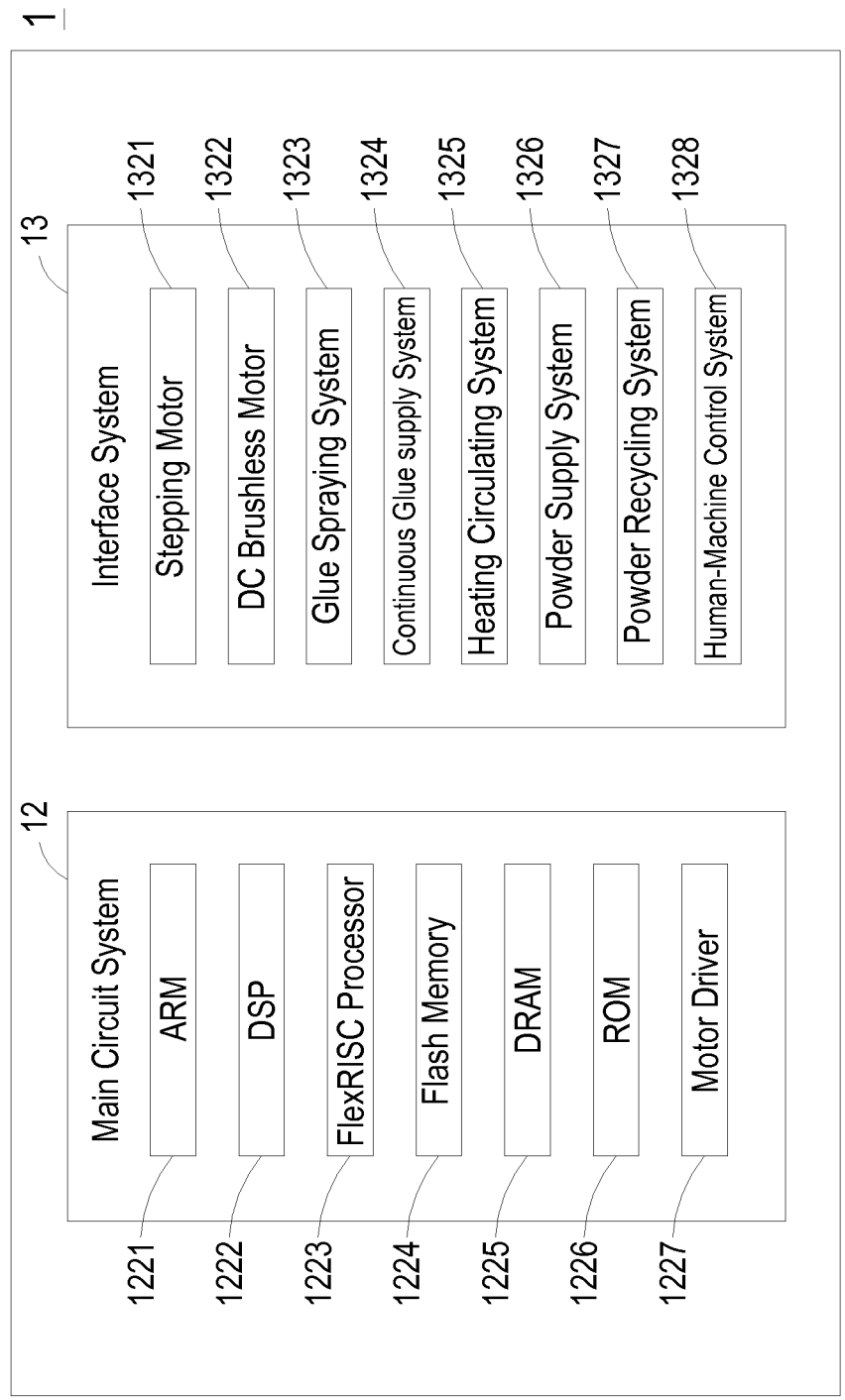
FIG. 3C shows the main control parts of the stereolithography structure according to the invention is shown.

Referring to FIG. 3A and FIG. 3B, wherein the flow chart illustrating the control method applied to the stereolithography structure according to the invention and the control system architecture applied to the stereolithography structure according to the invention are respectively shown. As shown in FIG. 3A and FIG. 3B, the control method applied to the stereolithography structure according to the invention includes the following steps. First, as shown in step S1, a stereolithography structure is provided, which at least includes a main circuit system, an interface system, a USB transmission interface, a diversified transmission interface, and a cloud computing architecture. The main circuit system is used to control the interface system. The interface system includes a printing driving platform for allowing the user to operate the stereolithography structure. Referring to FIG. 3C, wherein the main control parts of the stereolithography structure according to the invention is shown. The main circuit system 12 includes a chip-based control system consisted of an advanced RISC machine (ARM) 1221, a digital signal processor (DSP) 1222, a flexRISC processor 1223, a flash memory 1224, a dynamic random access memory (DRAM) 1225, a read-only memory (ROM) 1226, and a motor driver 1227. The interface system 13 includes a printing driving platform, which includes a motor driving system made up of a stepping motor 1321, a DC brushless motor 1322, and a servomotor 1329, a glue spraying system 1323, a continuous glue supply system 1324, a heating circulating system 1325, a powder supply system 1326, a powder recycling system 1327, and a human-machine control system 1328.

In this embodiment, the motor driving system uses the motor driver 1227 of the main circuit system 12 to send the control signals required by the motor (the forward/reverse signal of the X-axis servomotor 1329 (CW/CCW), the pulse-width modulation (PWM) signal of the Y-axis DC brushless motor 1322, and the forward/reverse signal of the Z-axis stepping motor 1321 (CW/CCW)), and drive the motors (X-axis servomotor 1329, Y-axis DC brushless motor 1322, and Z-axis stepping motor 1321) to operate, thereby functionally accomplishing the required operations.

The glue spraying system 1323 includes the printing module 11. The printing module 11 is mounted on the constructive base to displace. The printing module 11 includes a magnetic ruler and a printhead having a heater for performing an ink spraying operation. The optimum printing resolution of the printing module 11 is 600×500 dpi. The glue spraying system 1323 uses the main circuit system 12 along with the closed-loop system of the magnetic ruler to ascertain the position signal of the printhead and control the heater of the printhead to determine whether the glue should be sprayed and control the glue spraying operation. That is, the closed-loop system of the magnetic ruler provides the position signal of the printhead for the main circuit system 12, and then the main circuit system 12 provides a starting signal for the heater of the printhead. The continuous glue supply system 1324 is operating independently and is attached to the glue spraying system 1323 for continuously supplying glue to the printhead to attain the continuous ink spraying operation.

The heating circulating system 1325 includes a temperature sensor located in the vicinity of toner storage tanks of the stereolithography structure 1. The main circuit system is working with the temperature sensor to feed back an analog signal and convert the analog signal into a digital signal, which is in turn sent back to the main circuit system 12. This digital signal is sent from the main circuit system 12 to the switch of the heater of the printhead, so that the heater is appropriately regulated to turn on and off according to the set ambient temperature, thereby accomplishing the heating and circulating operation.

The powder supply system 1326 can be opened or closed (turn on or off) in the circuit system using the absorptive/emissive characteristics of the relay mounted in the main circuit system 12, thereby determining whether the motor configured to supply powder should be operating or not.

The powder recycling system 1327 includes a powder filter device 8, which includes a control unit, a powder absorbing unit, and a filter unit. The main circuit system 12 sends a switching signal to the control unit to functionally accomplishing the powder recycling operation.

The human-machine control system 1328 includes the touchscreen panel 10. The main circuit system 12 is used to communicate with the human-machine control system 1328 through the touchscreen panel 10 by a serial communication protocol (Modbus). By the commands and responses between the main circuit system 12 and the human-machine control system 1328, the control of the human-machine control system 1328 is attained. The display unit 100 and the input unit 101 are controlled by the human-machine control system 1328.

As shown in FIG. 3B, the USB transmission interface includes a print form host application or an image data processor for connecting to the external data, deciphering data, and re-formatting the data. Thus, the printing driving task is accomplished. The processed data is transmitted to the main circuit system 12 and the interface system 13. Also, the USB transmission interface can be plugged in when the stereolithography structure 1 is powered on, operating, or starting. That is, the USB transmission interface can be hot-plugged when the stereolithography structure 1 is powered on, operating, or starting.

Besides, the diversified transmission interface allows the user to select the most appropriate transmission as the transmission printing channel depending on the environment and user's demands. If the diversified transmission interface is applied, the individual user can select the USB interface to transmit the data of the control computer for printing, and the office user can select the Ethernet interface and the WIFI interface to transmit data for network scheduled printing. Therefore, the reliability of the stereolithography structure is improved.

Also, the inventive stereolithography structure employs a cloud computing architecture for reducing the cost of the control computer efficiently, reducing the spatial consumption of the stereolithography structure, providing a real-time troubleshooting channel, and providing software/firmware version update function. Thus, the dependency on the control computers is enhanced. Under the cloud computing architecture, the user only needs to establish Internet connectivity without depending on high-level, high-performance control computers. In this manner, the user can get the processing service from the remote host through the Internet to handle complicated printing files and drive the stereolithography structure to proceed with printing tasks.

Secondly, as shown step S2, a computer system is provided, which includes a data transmission platform for performing a slicing operation according to operational instructions to generate printing data and converting the slicing process data of the 3-D object which is operated externally into 2-D slicing printing format image data. The computer system is a single computer, a single server, or a single workstation. As shown in FIG. 3B, the computer system 24 can read the slicing data stored in the storage media 26 connected to the transmission interface 25 according to the operational instructions, and generate printing data by slicing operations. Alternatively, the computer system 24 can read the printing data pre-stored in the storage media 26 connected to the transmission interface 25 according to the operational instructions. The printing data is generated by slicing operations and pre-stored in the storage media 26, and is used for being transmitted to the interface system 13 to drive the printing module 11 to print. In other words, the computer system 24 can read the slicing data to be processed with slicing operation through the externally-connected storage media 26, or read the printing data to be printed for printing or perform object forming. Thus, the invention is convenient in providing data portability. The transmission interface 25 and the storage media 26 may be a serial advanced technology attachment (SATA) port and a serial advanced technology attachment (SATA) hard disk drive, respectively. Alternatively, the transmission interface 25 and the storage media 26 may be a universal serial bus port, and a flash disk, an externally-connected hard disk drive, an externally-connected optical disk drive, or a memory card reader.

Then, as shown in step S3, by the print form host application or the image data processor of the USB transmission interface or the diversified transmission interface, the individual user can select the USB interface to transmit the data of the control computer for printing, and the office user can select the Ethernet interface or the WIFI interface to perform network scheduled printing, Alternatively, by the cloud computing architecture, the user can get the processing service from the remote host through the Internet to provide the printing file. In this way, the 2-D slicing printing format image data converted by the data transmission platform of the computer system is transmitted, and the received data is deciphered and re-formatted, thereby accomplishing the pre-planning procedure of the driving operation to drive the printing driving platform to finish the object forming operation by ink spraying operations.

Referring to FIG. 3B and FIG. 3C, the computer system of the inventive stereolithography structure includes a data transmission platform. The data transmission platform is used to receive data through the print form host application of the image data processor of the USB transmission interface 25 and decipher the data and re-format the data. Afterwards, the processed data is transmitted to the main circuit system 12 and the interface system 13 to accomplish the pre-planning procedure of the driving operation.

The step S2 of the control method for the inventive stereolithography structure is used to generate the printing data by performing the slicing operation by the computer system 24 according to operational instructions. The slicing operation uses a smart discontinuous slicing method that is applied to the 3-D rapid prototyping system. The printing mode is achromatic ink spraying (i.e. the inner contour of the object is generally printed by transparent glue) combined with color ink spraying (i.e. the outer contour of the object is generally printed by color glue). When the printing module 11 of the stereolithography structure 1 is printing, the transparent liquid glue and the color liquid glue are respectively sprayed to combine the inner contour of the object with the outer contour of the object. The sliced contour of each sliced surface of the object is originated from the tangent line intersecting the grids and the tangential surfaces. Generally, the achromatic slicing contour and color contour of the sliced objects are at a closed state. However, if the object has discontinuous surfaces, the sliced contour is not at a closed state and the scope of the achromatic printing can not be ascertained.

The achromatic sliced contour indicates that the inner contour of the object is printed, and the color sliced contour indicates that the outer contour of the object is printed. If the object has discontinuous surfaces, the scope of the achromatic printing can not be ascertained. Thus, the color sliced contour and the black sliced contour must be processed separately.

Figure 4B:
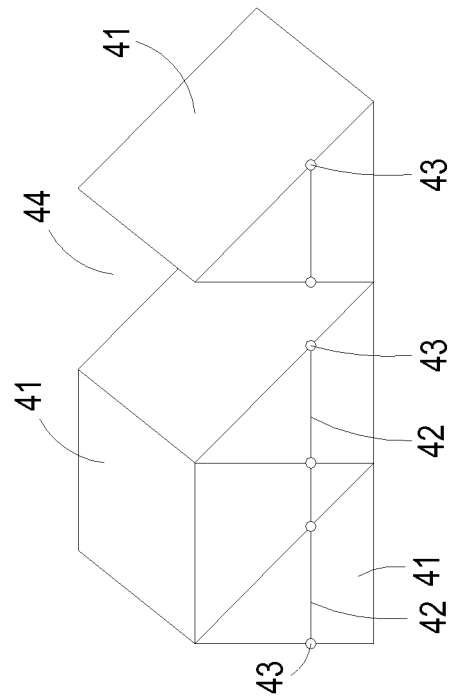
FIG. 4B shows the connection of the continuous tangent points of a discontinuous surface object under a sliced surface.
Figure 4A:
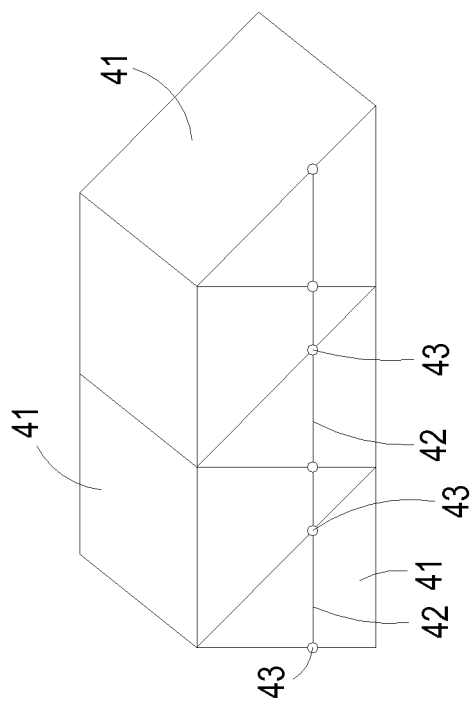
FIG. 4A shows the connection of the continuous tangent points of a continuous surface object under a sliced surface.

The sliced contour is generated according to the relationship between the grid and the sliced surface. Each time a grid is processed, the two tangent points on the grid that are intersected with the sliced surface are connected to form a tangent line until all the grids are processed. Thus, the sliced contour is obtained. FIG. 4A shows the connection of the continuous tangent points of a continuous surface object under a sliced surface. As shown, a plurality of grids are interconnected. Hence, the tangent points 43 of the grid 41 being intersected with the sliced surfaces 42 are connected with each other to generate a required sliced contour. FIG. 4B shows the connection of the continuous tangent points of a discontinuous surface object under a sliced surface. As shown, the tangent points are scarce as the discontinuous grids 44 are not existed, so that the discontinuous grids 44 can not connect to the adjacent grid 41 through the tangent point 43 of the grid 41. Thus, a sliced contour having a discontinuous surface is generated.

Figure 5:
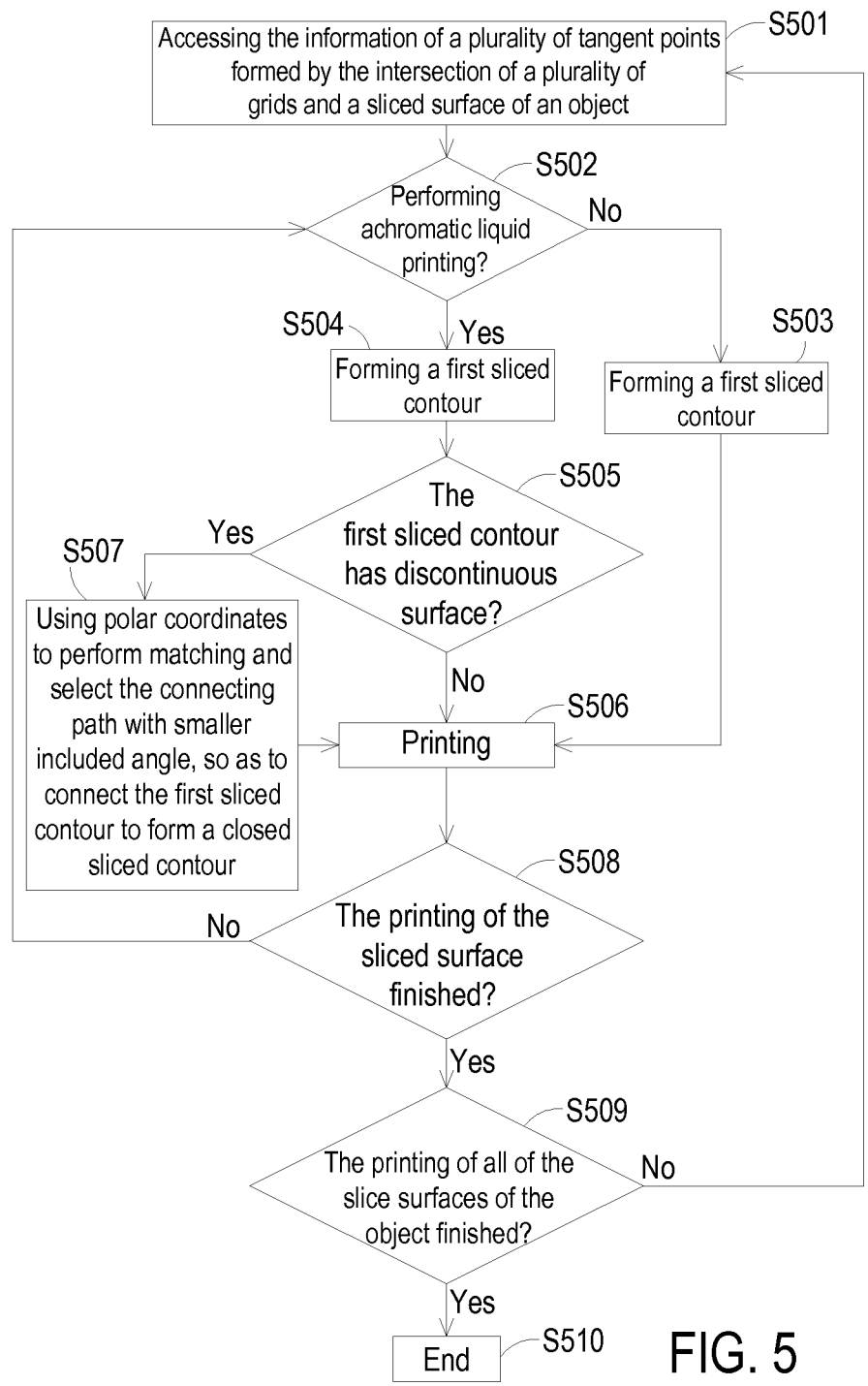
FIG. 5 illustrates the slicing method applied to the inventive stereolithography structure.
Figure 6A:
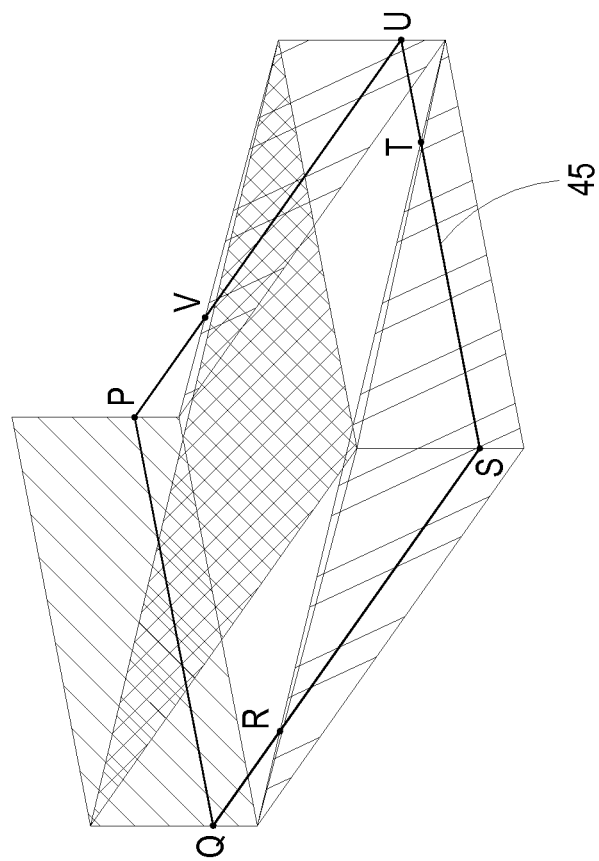
FIG. 6A shows the structure of an object having discontinuous surfaces.

The achromatic sliced contour must be closed so as to ascertain the scope of printing. Whether the color sliced contour is closed or not, it is relevant to the achromatic sliced contour. If the generated achromatic sliced contour can hold closeness, the problem of the defective contour resulted from the discontinuous surfaces is addressed. Referring to FIG. 5, wherein the slicing method applied to the inventive stereolithography structure is illustrated. The invention can connect the achromatic sliced contour having discontinuous surfaces to form a substantially closed sliced contour, thereby addressing the problem of defective contours resulted from discontinuous surfaces. As shown in FIG. 5, at first, the information of a plurality of tangent points formed by the intersection of a plurality of grids and a sliced surface of an object is accessed (step S501). For example, the information of the tangent points P-V formed by the intersection of a plurality of grids (not shown) and a sliced surface 45 of the object 6 shown in FIG. 6A is accessed. The information of the tangent points includes the coordinate of the tangent points, the color of the tangent points, and the mapping information of the tangent points. Each tangent point has its own index, and each grid is used to determine whether the tangent point is a starting tangent point or an ending tangent point in a counterclockwise manner. The tangent point formed in the downward path is determined as a starting tangent point, and the tangent point formed in the upward path is determined as an ending tangent point. The index of the starting tangent point can be defined as 0 or an even number, and the index of the ending tangent point can be defined as an odd number. The index does not repeat itself, but the information of the tangent point will repeat itself. The fact that the tangent point will repeat itself indicates that the two grids where the tangent point locates are adjacent. Hence, when a certain tangent point has only one index, it indicates that the tangent point is existed in a grid only. The discontinuous surface begins at this tangent point. The rule of connecting two tangent points is: (1) the starting tangent point is only connected to the ending tangent point. The connection between two starting tangent points or the connection between two ending tangent points are not allowed; (2) if a tangent point itself is an ending tangent point of a continuous surface and a starting tangent point of a discontinuous surface, the tangent point is not allowed to be connected to the starting tangent point of the continuous surface when the discontinuous surfaces are connected.

Next, it is determined if the printing module of the stereolithography structure will perform the achromatic liquid printing (step S502). If it is determined that the printing module of the stereolithography structure will not perform the achromatic liquid printing, the method continues with the step S503. At step S503, the two tangent points formed by the intersection of each grid and the sliced surface are interconnected according to the information of the tangent points, thereby forming a color sliced contour such as the sliced contour shown in FIG. 6B. Next, the printing module performs color liquid printing according to the color slice contour at step S506. On the contrary, if it is determined that the printing module of the stereolithography structure will perform the achromatic liquid printing, the two tangent points formed by the intersection of each grid and the sliced surface are interconnected according to the information of the tangent points, thereby forming a first sliced contour at step S504. The first sliced contour is the same with the contour shown in FIG.

6B. However, the difference between the color sliced contour and the first sliced contour is that the color sliced contour formed at the step S503 includes the color information for printing.

Next, it is determined if the first sliced contour has discontinuous surfaces at step S505. If it is determined that the first sliced contour has discontinuous surfaces, the polar coordinates are used to perform matching and the connecting path with smaller included angle is selected. That is, the non-closed sliced contour is connected to form a closed sliced contour by polar coordinate matching, and then the included angle is used to select an appropriate connecting side, thereby connecting the first sliced contour to form a closed sliced contour at step S507.

Next, the achromatic liquid printing is performed in the closed sliced contour at step S506. After the printing is done, it is determined if the printing of the sliced surface (i.e. color printing and/or achromatic printing) is finished at step S508. If it is determined that the printing of the sliced surface is not finished, the method continues with the step S502. If it is determined that the printing of the sliced surface is finished, the method continues with the step S509 to determine if the printing of all of the slice surfaces of the object is finished. If it is determined that the printing of all of the slice surfaces of the object is not finished at the step S509, the method continues with the step S501. If it is determined that the printing of all of the slice surfaces of the object is finished, the method continues with the step S510 to finish the slicing operation of the object.

Figure 7B:
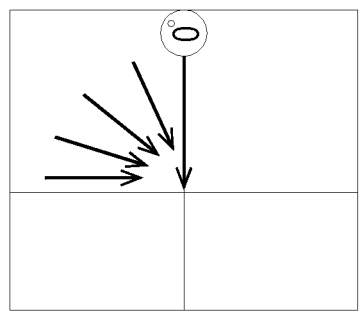
FIGS. 7A-7D illustrate the set position of the polar coordinate axes.
Figure 7D:
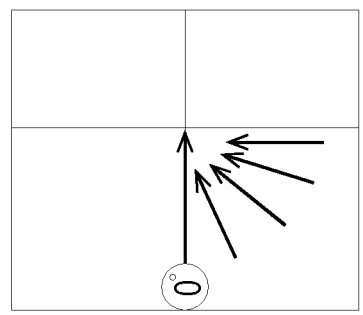
Figure 7A:
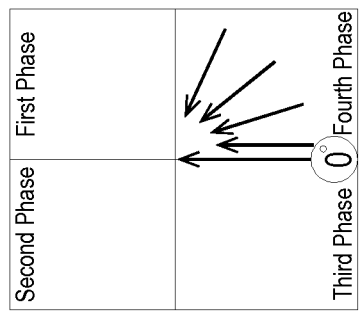
Figure 7C:
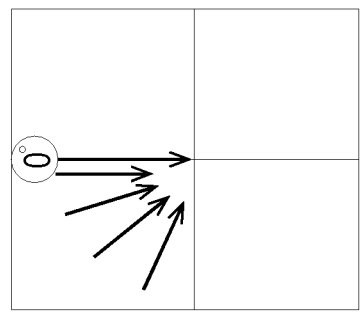

Next, the method of determining an appropriate connecting path by using polar coordinate matching according to the invention is illustrated. Referring to FIGS. 7A-7D, wherein the set position of the polar coordinate axes are illustrated. As shown, the polar coordinate system is divided into four phase, including a first phase (0°-90°), a second phase (90°-180°), a third phase (180°-270°), and a fourth phase (270°-360°). Also, the set position of the polar coordinate axis (0°) is determined by the previous path direction. As shown in FIG. 7A, when the previous path direction is located in the fourth phase, the set position of the polar coordinate axis (0°) is the negative direction of the Y-axis. As shown in FIG. 7B, when the previous path direction is located in the first phase, the set position of the polar coordinate axis (0°) is the positive direction of the X-axis. As shown in FIG. 7C, when the previous path direction is located in the second phase, the set position of the polar coordinate axis (0°) is the positive direction of the Y-axis. As shown in FIG. 7D, when the previous path direction is located in the third phase, the set position of the polar coordinate axis (0°) is the negative direction of the X-axis.

Figure 8E:
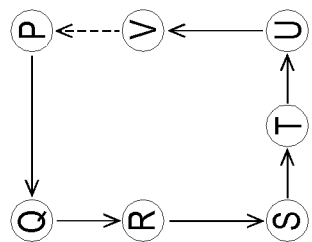
FIGS. 8A-8F illustrates the steps of connecting the non-closed sliced contour to form a closed sliced contour.
Figure 8F:
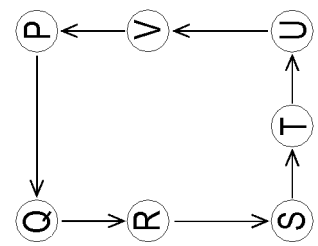
Figure 8D:
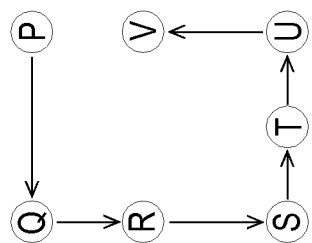

The method of determining the appropriate connecting path by using polar coordinate matching according to the invention is accomplished by using the position of the previous path direction in the polar coordinate system to determine the set position of the polar coordinate axis (0°). After the set position of the polar coordinate axis (0°) is determined, the connecting path having a smaller included angle with the polar coordinate axis (0°) is selected to be connected to an appropriate tangent point. Referring to FIGS. 8A-8F, wherein the steps of connecting the non-closed sliced contour to form a closed sliced contour are illustrated, and FIG. 8A shows the non-closed sliced contour of FIG. 6B. Next, the steps of connecting the non-closed sliced contour to form a closed sliced contour are illustrated with reference to FIGS. 8A-8F. First, the tangent point Q is the ending tangent point of the PQ line, and the tangent point that is likely to be connected therewith is the starting tangent point R of the RS line or the starting tangent point U of the UV line. Referring to FIG. 9, the set position of the polar coordinate axis (0°) is selected as the positive direction of the X-axis according to the previous path direction P→Q, as shown in FIG. 7B, where the included angle θ1 is the angle that starts at the polar coordinate axis (0°) and ends at the QR line and the included angle θ2 is the angle that starts at the polar coordinate axis and ends at the QU line. When it is desired to select an appropriate path, the connecting path having a smaller included angle will be selected. In this case, the angle θ1 is smaller than the angle θ2, and the path Q→R is the appropriate connecting path, as shown in FIG. 8B.

Figure 8C:
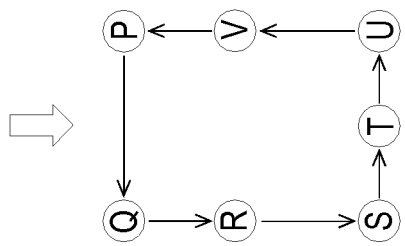
Figure 8A:
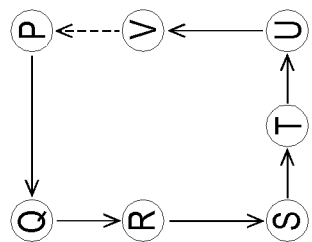
Figure 8B:
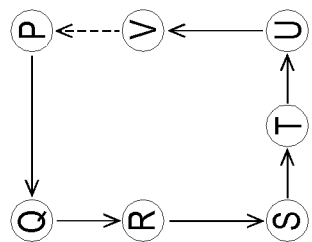
Figure 9:
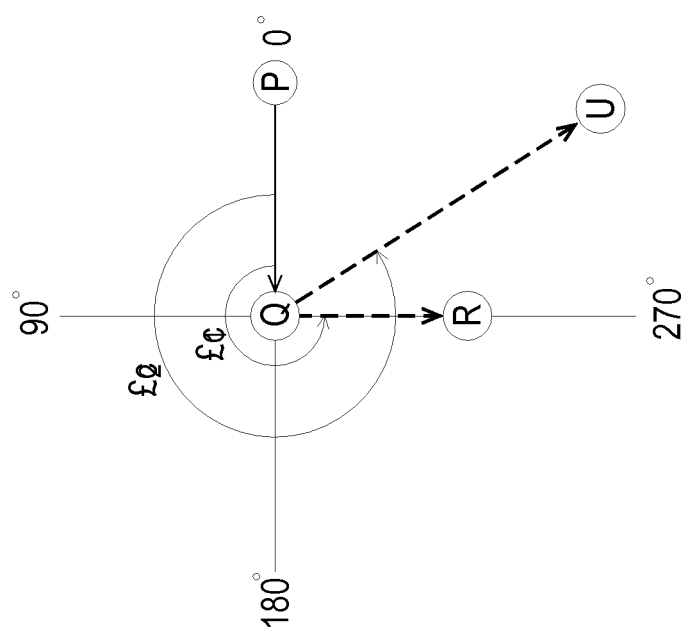
FIG. 9 illustrates the selection of the connecting path for the tangent point Q shown in FIG. 8A.
Figure 10:
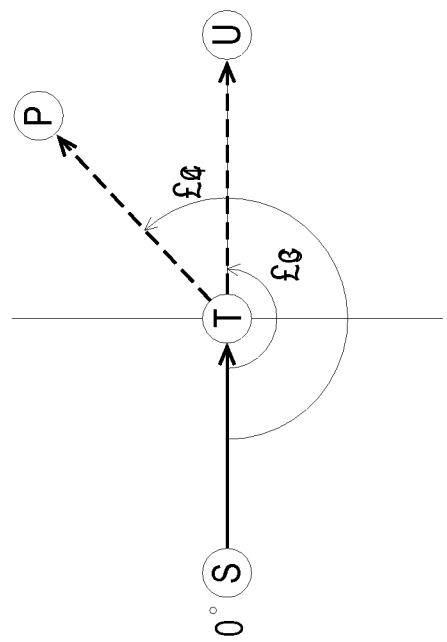
FIG. 10 illustrates the selection of the connecting path for the tangent point T shown in FIG. 8C.

Next, referring to FIG. 8C, the tangent point T is the ending tangent point of the ST line, and the tangent point that is likely to be connected therewith is the starting tangent point U of the UV line or the starting tangent point P of the PQ line. Referring to FIG. 10, the set position of the polar coordinate axis (0°) is selected as the negative direction of the X-axis according to the previous path direction S→T, as shown in FIG. 7D, where the included angle θ3 is the angle that starts at the polar coordinate axis (0°) and ends at the TU line and the included angle θ4 is the angle that starts at the polar coordinate axis and ends at the TP line. When it is desired to select an appropriate path, the connecting path having a smaller included angle will be selected. In this case, the angle θ3 is smaller than the angle θ4, and the path T→U is the appropriate connecting path, as shown in FIG. 8D.

Figure 6D:
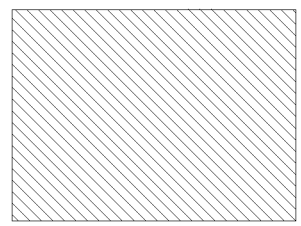
FIG. 6D shows the printing module of the stereolithography structure spraying achromatic liquid in the closed sliced contour shown in FIG. 6C.
Figure 6C:
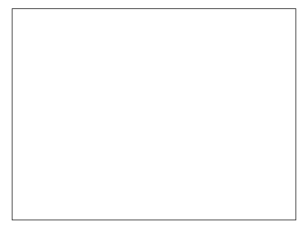
FIG. 6C shows the closed sliced contour which is made by connecting the non-closed sliced contour of FIG. 6B.
Figure 6B:
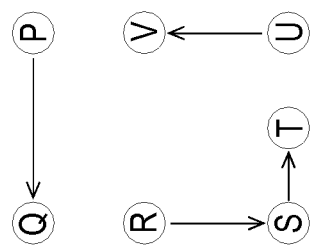
FIG. 6B shows the non-closed sliced contour of a sliced surface of FIG. 6A.
Figure 11:
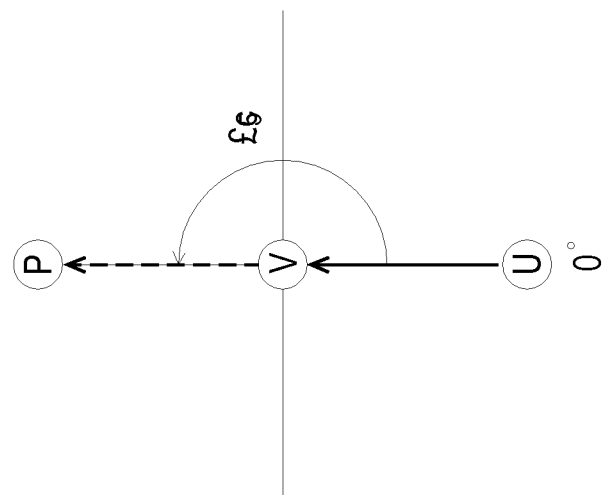
FIG. 11 illustrates the selection of the connecting path for the tangent point V shown in FIG. 8E.

Afterwards, referring to FIG. 8E and FIG. 11, the tangent point V is the ending tangent point of the UV line. The set position of the polar coordinate axis (0°) is selected as the negative direction of the Y-axis according to the previous path direction U→V, as shown in FIG. 7A, where the included angle θ5 is the angle that starts at the polar coordinate axis (0°) and ends at the VP line and is the smallest included angle. Therefore, the path V→P is the appropriate connecting path, as shown in FIG. 8F. In this manner, the non-closed sliced contour having three discontinuous surfaces shown in FIG. 8A can be connected to form a closed sliced contour, as shown in FIG. 8F and FIG. 6C, so that the scope of the achromatic printing can be ascertained. Thus, the printing module of the stereolithography structure can spray achromatic liquid within the scope of the achromatic sliced contour shown in FIG. 6B, as shown in FIG. 6D.

In conclusion, the control method for the stereolithography structure according to the invention includes a platform architecture and operation mechanism involved with human-machine interaction, hardware/firmware control driving and software sliced layer. By way of the human-machine interaction, the stereolithography structure is advantageous in terms of (1) an intuitive graphical human-machine interactive interface, (2) a single computer system, and (3) portable printing capability. The hardware/firmware control driving function is advantageous in terms of a high-speed transmission interface, a diversified transmission interface, a cloud computing architecture, a hot-swappable, hot-pluggable protection mechanism, and a high printing resolution. Also, the discontinuous slicing method of the software sliced layer can address the problems encountered by the prior art that the versatility of the control method is poor, the computer system is complicated, the idling time of the computer system is too long, the printing channel is limited, the transmission rat of the transmission interface is too low, the risk of damaging the components is too high, the printing resolution is too low, the efficiency of the slicing method is poor, and the inability of processing object slice later having discontinuos surface. Thus, the invention is featured by a simple computer system with an easy-to-use interface, a diversified and portable printing channel, improved transmission efficiency, a lower risk of damaging the components, an enhanced printing resolution, a better slicing efficiency using smart discontinuous slicing method, and the ability of processing objects having discontinuous surfaces. Thus, the invention provides a friendly, stable, highly efficient control method for a 3-D rapid prototyping apparatus.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A control method for a stereolithography structure, comprising the steps of:
   (a) providing a stereolithography structure including a main circuit system, an interface system, and a universal serial bus transmission interface, wherein the main circuit system is used to control the interface system, and the interface system includes a printing driving platform for allowing an user to operate the stereolithography structure;
   (b) providing a computer system including a data transmission platform for generating printing data by performing a discontinuous polar coordinate slicing operation according to operational instructions and converting slicing process data of a 3-D object which is operated externally into 2-D slicing printing format image data, wherein the discontinuous polar coordinate slicing operation comprises steps of:
   forming a first sliced contour according to the information of the tangent points formed by an object;
   determining if the first sliced contour has discontinuous surfaces; and
   if it is determined that the first sliced contour has discontinuous surfaces, the first sliced contour is connected to form a closed sliced contour by polar coordinate matching; and
   (c) transmitting and receiving the 2-D slicing printing format image data converted by the data transmission platform of the computer system through the universal serial bus transmission interface, and deciphering received data and re-formatting the received data, in order to finish pre-planning procedure of driving operation, thereby transmitting data to the printing driving platform to drive the printing driving platform to finish object forming operation by ink spraying operations.

2. The control method for a stereolithography structure according to claim 1 wherein the main circuit system includes an advanced reduced instruction set computing machine, a digital signal processor, a FlexRISC processor, a flash memory, a dynamic random access memory, a read-only memory, and a motor driver.

3. The control method for a stereolithography structure according to claim 1 wherein the printing driving platform of the interface system includes a motor driving system, a glue spraying system, a continuous glue supply system, a heating circulating system, a powder supply system, a powder recycling system, and a human-machine control system.

4. The control method for a stereolithography structure according to claim 3 wherein the human-machine control system includes a touchscreen panel including a display unit, an input unit, and a processor unit, wherein the display unit is used to display an user interface and having a touch area, and wherein the user interface is used selectively display function entries, messages, and information of the stereolithography structure, and the touch area is allowed to be touched to select the function entries in the user interface, and wherein the input unit is located corresponding to the touch area, and when the user touches a touch point in the touch area to select the user interface, the input unit generates a gesture signal according to the position of the touch point, and wherein the processor unit is connected to the input unit for receiving the gesture signal and controlling the stereolithography structure to execute a function according to the gesture signal, and wherein the processor unit is connected to the display unit for controlling the display unit to display a screen according to the gesture signal.

5. The control method for a stereolithography structure according to claim 3 wherein the glue spraying system includes a printing module with a printing resolution of 500-600 dots per inch.

6. The control method for a stereolithography structure according to claim 1 wherein the universal serial bus transmission interface includes a print from host application or an image data processor for receiving the 2-D slicing printing format image data converted by the data transmission platform of the computer system, and deciphering the received data and re-formatting the received data, in order to finish pre-planning procedure of driving operation.

7. The control method for a stereolithography structure according to claim 1 wherein the computer system includes a single computer, a single server, or a single workstation.

8. The control method for a stereolithography structure according to claim 1 wherein the step (a) further includes the sub-steps of:
   (a1) connecting the universal serial bus interface to a portable storage media to get data and inputting data from the portable storage media in an computer system, and transmitting printing data which has been undergone sliced operations to the interface system and deciphering received data and re-formatting the received data, in order to finish pre-planning procedure of driving operation, thereby transmitting data to the printing driving platform to drive the printing driving platform to finish object forming operation by ink spraying operations.

9. The control method for a stereolithography structure according to claim 1 wherein the slicing operation is a smart discontinuous slicing operation, which is carried out by the following steps of:
   (b1) accessing information of a plurality of tangent points formed by the intersection of a plurality of grids and a sliced surface of an object;
   (b2) determining if a printing module should perform achromatic liquid printing;
   (b3) if it is determined that printing module will perform achromatic liquid printing, two tangent points formed by the intersection of each grid and the sliced surface are interconnected according to the information of the tangent points, thereby forming a first sliced contour; and
   (b4) determining if the first sliced contour has discontinuous surfaces, and if it is determined that the first sliced contour has discontinuous surfaces, using polar coordinates to perform matching and selecting the connecting path with smaller included angle, thereby connecting the first sliced contour to form a closed sliced contour and performing achromatic liquid printing in the closed sliced contour.

10. The control method for a stereolithography structure according to claim 9 wherein the step (b3) further includes the sub-steps of:
- (b31) if it is determined that printing module will not perform achromatic liquid printing, two tangent points formed by the intersection of each grid and the sliced surface are interconnected according to the information of the tangent points, thereby forming a color sliced contour and driving the printing module to perform color liquid printing according to the color sliced contour.

11. The control method for a stereolithography structure according to claim 9 wherein the information of the tangent points includes the coordinate of the tangent points, the color of the tangent points, and the mapping information of the tangent points.

12. The control method for a stereolithography structure according to claim 9 wherein each grid is used to determine whether a tangent point is a starting tangent point or an ending tangent point in a counterclockwise manner, and wherein the tangent point formed in a downward path is determined as a starting tangent point, and the tangent point formed in an upward path is determined as an ending tangent point.

13. The control method for a stereolithography structure according to claim 12 wherein connection between two tangent points are made by connecting a starting tangent point to an ending tangent point.

14. The control method for a stereolithography structure according to claim 9 wherein the step of using polar coordinates to perform matching and selecting the connecting path with smaller included angle at the step (b4) is accomplished by determining a set position of a polar coordinate axis according to the position of a previous path direction in a polar coordinate system, and selecting a connecting path with a smaller included angle with the polar coordinate axis after the set position of the polar coordinate axis is determined.

15. The control method for a stereolithography structure according to claim 14 wherein the set position of the polar coordinate axis is the positive direction of the X-axis, the negative direction of the X-axis, the positive direction of the Y-axis, or the negative direction of the Y-axis.

16. The control method for a stereolithography structure according to claim 9 wherein after the step (b4), the step (b) further includes the sub-step of:
- (b5) determining if the sliced surface has been printed.

17. The control method for a stereolithography structure according to claim 16 wherein if it is determined that the sliced surface has not been printed, executing the sub-step (b2).

18. The control method for a stereolithography structure according to claim 16 wherein after the step (b5), the step (b) further includes the sub-step of:
- (b6) if it is determined that the sliced surface has been printed, determining if all of the sliced surfaces of the object have been printed;
- (b7) if it is determined that not all of the sliced surfaces of the object have been printed, executing the sub-step (b1); and
- (b8) if it is determined that all of the sliced surfaces of the object have been printed, finishing the slicing operation of the object.

19. A control method for a stereolithography structure, comprising the steps of:
- (a) providing a stereolithography structure including a main circuit system, an interface system, and a universal serial bus transmission interface, wherein the main circuit system is used to control the interface system and the interface system includes a printing driving platform for allowing an user to operate the stereolithography structure;
- (b) providing a computer system including a data transmission platform for generating printing data by performing a discontinuous polar coordinate slicing operation according to operational instructions and converting slicing process data of a 3-D object which is operated externally into 2-D slicing printing format image data, wherein the discontinuous polar coordinate slicing operation comprises steps of:
  - forming a first sliced contour according to the information of the tangent points formed by an object;
  - determining if the first sliced contour has discontinuous surfaces; and
  - if it is determined that the first sliced contour has discontinuous surfaces, the first sliced contour is connected to form a closed sliced contour by polar coordinate matching; and
- (c) by a diversified transmission interface, allowing an individual user to transmit data of a control computer for printing through the universal serial bus transmission interface and allowing an office user to perform network scheduled printing through an Ethernet interface or a WIFI interface, in order to finish pre-planning procedure of driving operation, thereby transmitting data to the printing driving platform to drive the printing driving platform to finish object forming operation by ink spraying operations.

20. A control method for a stereolithography structure, comprising the steps of:
- (a) providing a stereolithography structure including a main circuit system, an interface system, and a universal serial bus transmission interface, wherein the main circuit system is used to control the interface system and the interface system includes a printing driving platform for allowing an user to operate the stereolithography structure;
- (b) providing a computer system including a data transmission platform for generating printing data by performing a discontinuous polar coordinate slicing operation according to operational instructions and converting slicing process data of a 3-D object which is operated externally into 2-D slicing printing format image data, wherein the discontinuous polar coordinate slicing operation comprises steps of:
  - forming a first sliced contour according to the information of the tangent points formed by an object;
  - determining if the first sliced contour has discontinuous surfaces; and
  - if it is determined that the first sliced contour has discontinuous surfaces, the first sliced contour is connected to form a closed sliced contour by polar coordinate matching; and
- (c) by a cloud computing architecture, getting a processing service from a remote host through Internet and providing a printing file, in order to finish pre-planning procedure of driving operation, thereby transmitting data to the printing driving platform to drive the printing driving platform to finish object forming operation by ink spraying operations.

\* \* \* \* \*